United States Patent Office 2,986,572
Patented May 30, 1961

2,986,572
17α-HALO-Δ⁴-PREGNENE COMPOUNDS

Charles Robert Engel, London, Ontario, Canada, assignor, by mesne assignments, to Canadian Patents and Development Limited, Ottawa, Ontario, Canada, a company No Drawing. Filed Nov. 4, 1957, Ser. No. 694,091

3 Claims. (Cl. 260—397.3)

The present invention relates to the preparation of 17 alpha-halo progesterones and related products such as 17 halo corticoids, in particular the 17 alpha-halo-progesterones of the following formula:

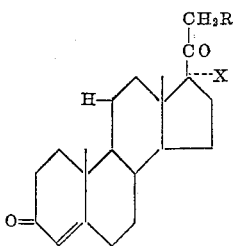

In the above formula X is a member of the group consisting of Br and Cl, and R is a member of the group consisting of H, OH, alkyl COO, aryl COO, cycloalkyl COO, tosyloxy and mesyloxy.

One of the objects of the invention is to provide methods of preparing 17 alpha-halo-progesterones and their analogues and derivatives in particular their 11 and/or 21 oxygenated derivatives, many of which are biologically active, some of them exhibiting progestational, corticoid, ovluation inhibiting, growth inhibiting, anti-estrogenic, anti-androgenic, and anti-fibromatogenic effects.

Throughout the disclosure the values for R and $R_1$ may be construed somewhat more broadly as follows: R=H, OH, alkyl-COO, aryl-COO, cycloalkyl-COO, tosyloxy, mesyloxy, alkyloxy, cycloalkyloxy, aryloxy and other derivatives of a 21-hydroxy function; $R_1$=H, beta-OH, =O (ketonic oxygen), beta-acyloxy, alkyloxy, cycloalkyloxy, aryloxy, and other derivatives of an 11-hydroxy function.

As indicated above the present invention deals particularly with the effects of further changes of structure in position 17 alpha. The introduction of halogen atoms into position 17 alpha seemed of particular interest since other halogen substitutions in positions vicinal to an important ketone or carbinol grouping can lead to biologically highly active products; thus, several 9 alpha- or 12 alpha-halogenated 11-oxygenated steroids are potent corticoids, 21-fluoroprogesterone is a very active luteoid, and some 21-fluorinated corticoids also possess marked activity.

A series of representative reactions leading to 17-halogenated hormone analogues of the progesterone-corticoid group, in particular of 17-brominated and chlorinated derivatives may be graphically illustrated as follows:

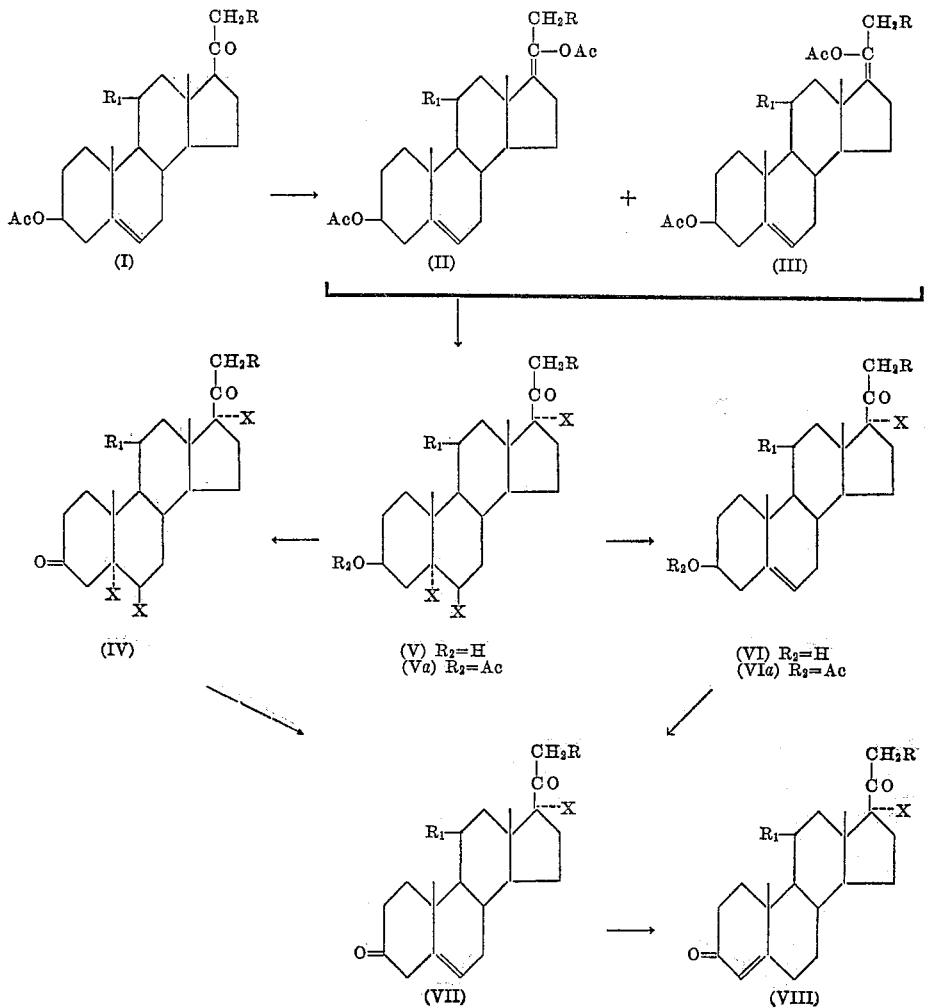

X is a member of the group Br and Cl
R=H, OH, alkyl-COO, aryl-COO, cycloalkyl-COO, tosyloxy, mesyloxy and other esters of a 21-hydroxy function
$R_1$=H, beta-OH, =O (ketonic oxygen), beta-acyloxy, and other ester derivatives of an 11-hydroxy function
AcO=acyloxy Names of final products:
17 alpha-halo-4-pregnene-3,20-diones
17 alpha-halo-21-hydroxy-4-pregnene-3,20-diones and their 21-ester derivatives A 3-acyloxy-5-pregnene-20-one derivative of the general Formula I in which R, $R_1$ and AcO have the values and significances indicated in the graphical representation, is transformed to a mixture of the corresponding 17-en-20-ol acetates II and III or to analogues enol esters by the action of such agents as acetic anhydride in the presence of such catalysts as para-toluenesulfonic acid. The mixture is halogenated to a 5,6,17-trihalide of the general Formula Va in which R, $R_1$ and AcO have the same meaning as in Formula I. Alternatively the progesterone derivative I can be halogenated directly to the trihalide Va. The acyloxy group of the latter is hydrolyzed in acid medium and the resulting 3-hydroxy-5,6-17-trihalo compound V oxidized with chromic acid in an appropriate solvent, such as acetic acid, acetone, chloroform, carbon tetrachloride, methylene chloride and other solvents, to the tribromo derivative of the general Formula IV. The double bond in position 5,6 is restored by partial dehalogenation with an alkali iodide such as sodium iodide, preferably by a short treatment at elevated temperature in an appropriate solvent, for instance by refluxing the mixture for a short period of time in dry acetone preferably with the exclusion of oxygen. The resulting 17-monohalide of the general Formula VII is converted to the delta$^4$-17-halogenated hormone analogue of the general Formula VIII by treatment with acid.

Alternatively the sequence of reactions can be reversed and the acyloxy trihalo compound of the general Formula Va partially dehalogenated by the action of an alkali iodide, the resulting acyloxy monohalide of the general Formula VIa hydrolyzed in acid medium to the corresponding free alcohol of the general Formula VI and the latter oxidized with chromic acid to the delta$^5$-3-oxohalide of the general Formula VII which is again rearranged to the 17-halogenated hormone analogue of the general Formula VIII as described above.

A particularly valuable member of the progesterone-corticoid series and of the 17 alpha-halo-progesterone group is 17 alpha-bromoprogesterone.

A series of representative reactions follows:

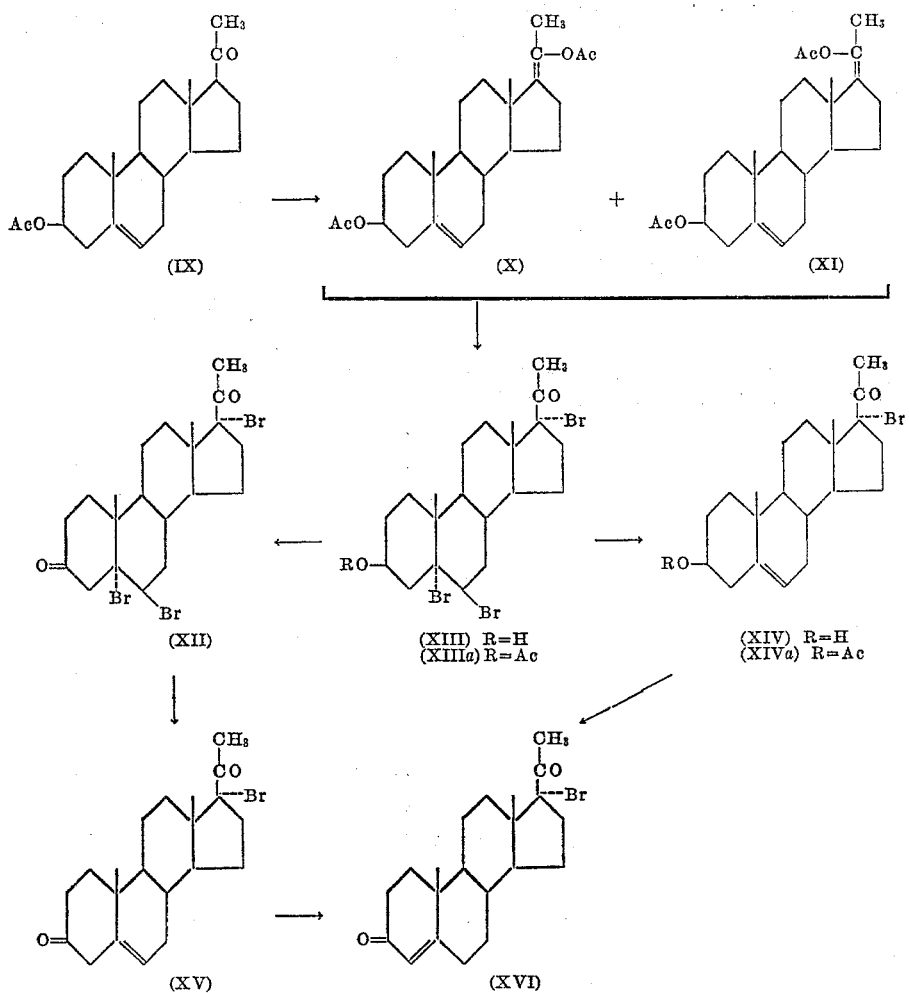

In preparing that particular substance 5 alpha, 6 beta, 17 alpha-tribromo-3 beta-acetoxy-5-allopregnane (XIIIa) may be used as starting material. It was prepared from delta$^5$-3 beta-acetoxy-20-oxopregnene (IX) via the mixture of the isomeric enol acetates X and XI. The bromination was carried out in the presence of potassium acetate, in order to avoid side reactions.

The acetate group of the tribromo compound (XIIIa) was hydrolyzed by the action of hydrogen chloride in a mixture of absolute methanol and methylene chloride and the resulting unstable hydroxy tribromide (XIII) oxidized with chromic acid in acetic acid or in acetone in the presence of sulfuric acid to the tribromo ketone (XII); this unstable product was not isolated in the pure state but debrominated selectively in positions 5 and 6 by the action of sodium iodide in boiling acetone. Part of the reaction product (compare XV) had undergone rearrangement to the delta⁴-3-keto derivative (XVI) during the reaction; in order to complete the shift of the double bond, the crude product was treated for a short period with hydrochloric acid in boiling ethanol. The resulting crude 17 alpha-bromoprogesterone (XVI) was purified by chromatography on silica gel and by recrystallizations from ether-hexane.

17 alpha-bromoprogesterone may also be obtained by an alternate route, which is considerably more advantageous than the above described method since all intermediates of the second route are stable and crystalline products. The tribromo ketone (XIIIa) was selectively debrominated to the acetoxy monoketone (XIVa) by the action of sodium iodide in boiling acetone; this procedure gave better results than the prolonged treatment at room temperature. The acetate group of (XIVa) was hydrolyzed with hydrogen chloride in methanol, or with perchloric acid in methanol and the resulting hydroxy bromo ketone (XIV) was oxidized with chromic acid in acetone, in the presence of sulfuric acid. The crude reaction product (compare XV) was directly rearranged to 17 alpha-bromoprogesterone.

DETAILED PREPARATION OF 17 ALPHA-BROMOPROGESTERONE

Example 1

5 ALPHA, 6 BETA, 17 ALPHA-TRIBROMO-3 BETA-ACETOXY-5-ALLOPREGNANE-20-ONE (XIIIa)

To a solution of 19.758 g. of 3 beta-acetoxy-5-pregnene-20-one (IX) in 1 l. of acetic anhydride was added 5.56 g. of p-toluenesulfonic acid. The solution was slowly reduced by distillation, to 500 cc., in the course of 8 hours. Subsequently the majority of the solvent was removed in vacuo and the residue was extracted with ether. The ethereal solution was washed with water, iced saturated bicarbonate solution and water and was dried. The solvent was removed and the resulting product was dissolved in a small amount of benzene and absorbed on 200 g. of aluminum oxide (pH 6). Elution with 1.5 l. of benzene afforded 19.477 g. of a yellowish, crystalline mixture of enol acetates X and XI.

This mixture was dissolved in 250 cc. of acetic acid and there was added, dropwise and with stirring, within 10 min. and at room temperature, a solution of 17.09 g. of bromine in 103.6 cc. of acetic acid to which had been mixed a solution of 4.762 g. of potassium acetate in 3 cc. of water. At the end of the addition of the bromine solution the tribromide (XIIIa) crystallized from the reaction mixture. Filtration afforded 20.665 g. of colourless leaflets which yielded after one recrystallization from methylene chloride-methanol 19.148 g. of tribromide XIIIa, M.P. 156–157°. The mother liquors were combined with the filtrate of the original crystallization and there was added 70 cc. of water. The mixture was heated to 85° and treated in the usual manner with 10 g. of zinc dust, for 30 min. The usual working up afforded an amorphous product which yielded after chromatography 4.424 g. of starting material I, M.P. 136–138° (total yield of tribromide XIIIa from IX, considering the recovery of starting material, 90%).

5 ALPHA, 6 BETA, 17 ALPHA-TRIBROMO-3 BETA-HYDROXY-5-ALLOPREGNANE-20-ONE (XIII)

A solution of 2 g. of the tribromo acetate XIIIa, M.P. 156–157°, was dissolved in 15 cc. of methylene chloride and treated with 30 cc. of a 1% solution of hydrogen chloride in absolute methanol. The solution was kept in the dark for 24 hours, at room temperature. Subsequently ether was added and the solution was washed with water, iced sodium bicarbonate solution and with water and was dried. The solvents were removed, at first at atmospheric pressure, subsequently in vacuo. Upon addition of methanol the product crystallized. Filtration afforded 1.057 g. of hydroxy tribromide XIII, M.P. 121–123°, dec., depressed upon admixture with tribromo acetate (XIIIa). The product is unstable; the M.P. was lowered by recrystallization from methylene chloride-methanol to 93–96°; the adduct was therefore used without further purification in the following reaction.

5 ALPHA, 6 BETA, 17 ALPHA-TRIBROMO-5-ALLOPREGNANE-3,20-DIONE (XII)

(a) To a solution of 1 g. of hydroxy tribromide XIII, M.P. 92–93° dec., in 10 cc. of acetic acid was added at room temperature 135 mg. of chromic acid in 2 cc. of acetic acid and 0.5 cc. of water. After 18 hours the mixture was poured into water and extracted with ether. The ethereal solution was washed with water, iced sodium bicarbonate solution and water and was dried. The solvent was removed in vacuo. In the course of this operation part of the product crystallized. The mother liquors were taken to dryness and recrystallized from methanol. There was obtained 663 mg. (66%) of crystalline tribromo diketone XII, M.P. 92–93° dec. The product was very unstable.

(b) A solution of 1.4 g. of hydroxy tribromide XIII, M.P. 95–96°, in 20 cc. of dry acetone was treated with 2 cc. of a solution prepared from 100 g. of chromic acid, 160 g. of concentrated sulfuric acid and 500 cc. of water. The reaction mixture was kept for 24 hours at 0° and was extracted subsequently with ether. The ethereal solution was washed with water, iced sodium bisulfite solution, iced sodium bicarbonate solution and water and was dried. Removal of the solvent in vacuo afforded 1.4 g. of a partly crystalline unstable reaction product (compare XII) which was used without further purification in the following reaction.

PARTIAL DEBROMINATION OF THE TRIBROMIDE IV [17 ALPHA-BROMO-5-PREGNENE-3,20-DIONE] (XV)

The crude tribromo diketone XII (1.4 g.) was dissolved in 50 cc. of absolute acetone and refluxed for 10 min. with 750 mg. of sodium iodide. The solution was cooled to room temperature and the free iodide was titrated by addition of 36 cc. of a 0.1 N thiosulfate solution. Subsequently the mixture was extracted with ether, the ethereal solution was washed with water and was dried. Removal of the solvent in vacuo afforded 985 mg. of crude monobromide XV, containing some delta⁴-3-ketonic product, indicated by an absorption maximum of low intensity at 240 mμ.

17 ALPHA-BROMOPROGESTERONE (XVI) FROM TRIBROMIDE XIIIa VIA THE INTERMEDIATES XIII, XII AND XV

The above mentioned, crude, amorphous delta⁵-3,20-dioxo-bromide (XV) (985 mg.) was dissolved in 40 cc. of methanol and was refluxed for 5 min. with 0.5 cc. of water containing one drop of concentrated hydrochloric acid. The product was extracted with ether and the ethereal solution was washed with water, iced sodium bicarbonate solution and with water and was dried. The solvents were removed in vacuo and the resulting product was dried with benzene. There was obtained 979 mg. of needles, representing crude 17 alpha-bromoprogesterone (XVI). The product was dissolved in benzene and chromatographed on 30 g. of silica gel. Benzene, containing 2% of ethyl acetate, eluted 780 mg. of crystalline material which melted after one recrystallization from methylene chloride-hexane at 162–163°. A sample was recrystallized twice for analysis; M.P. 162–163°, $[\alpha]_{D20°}^{24}$ (c. 0.949 in $CHCl_3$), $\lambda_{max}^{EtOH}$ 241 mμ (log ε 4.2), $\gamma_{max}^{KBr}$ 1692 cm.⁻¹ (20-ketone), 1661 and 1611 cm.⁻¹ (delta⁴-3-keto doublet)

Analysis.—Calc. for $C_{21}H_{29}O_2Br$: C, 64.12; H, 7.43; Br, 20.32. Found: C, 64.24; H, 7.39; Br, 20.51.

Example 2

17 ALPHA-BROMO-3 BETA-ACETOXY-5-PREGNENE-20-ONE (XIVa)

A solution of 2.27 g. of the tribromo acetate XIIIa, M.P. 156–157°, in 40 cc. of absolute acetone was refluxed for 10 min. in a nitrogen atmosphere with a solution of 2 g. of sodium iodide in 10 cc. of absolute acetone. After cooling the liberated iodine was titrated with 75 cc. of a 0.1 N sodium thiosulfate solution. Subsequently the product was precipitated with water; filtration afforded 1.315 g. of monobromide XIVa, crystallizing in leaflets and melting at 140.5–141°. The mother liquors yielded another batch of 225 mg. of XIVa, M.P. 136–139° (total yield 92%). A sample was recrystallized twice from methylene chloride-methanol for analysis; M.P. 146–147°.

*Analysis.*—Calc. for $C_{23}H_{33}O_3Br$: C, 63.15; H, 7.61; Br, 18.27. Found: C, 63.30; H, 7.63; Br, 18.17.

17 ALPHA-BROMO-3 BETA-HYDROXY-5-PREGNENE-20-ONE (XIV)

(a) Acetate XIVa (370 mg., M.P. 144.5–145.5°) was dissolved in 15 cc. of absolute methanol containing 150 mg. of hydrogen chloride. The solution was kept at room temperature for 24 hours. By addition of water 282 mg. of the hydroxy bromide XIV, M.P. 133–135°, was precipitated (84% yield). The product showed occasionally a double melting point of 100°/133–135°. A sample was recrystallized twice from aqueous methanol for analysis; plates, M.P. 143.5–144.5°.

*Analysis.*—Calc. for $C_{21}H_{31}O_2Br$: C, 63.79; H, 7.90; Br, 20.21. Found: C, 63.52; H, 7.73; Br, 20.36.

(b) A solution of 391 mg. of acetate (XIVa) in 15 cc. of methanol containing 0.38 cc. of 72% perchloric acid, was kept at room temperature for 24 hours. Precipitation with water afforded 286 mg. of the hydroxy bromide XIV, M.P. 139.5–140.5°, identical with the product prepared as described under (a).

OXIDATION OF 17 ALPHA-BROMO-3 BETA-HYDROXY-5-PREGNENE-20-ONE (17 ALPHA-BROMO-5-PREGNENE-3, 20-DIONE (XV))

To a solution of 286 mg. of the hydroxy bromide XIV in 40 cc. of absolute acetone, 0.24 cc. of the oxidizing solution described above (prepared from 100 g. of chromic acid, 160 g. of conc. sulfuric acid and 500 cc. of water) was added dropwise under nitrogen. After 5 min. the reaction product was precipitated with water. There was obtained 239 mg. of crude diketone XV, crystallizing in needles and melting at 100–101° (84% yield). Since the ultraviolet spectrum of the product indicated that the shift of the double bond had occurred to some extent, the crude product was used without purification in the following reaction.

17 ALPHA-BROMOPROGESTERONE (XVI) VIA THE INTERMEDIATES XIVa, XIV AND XV

The above described crystalline diketone XV was rearranged as described above. By crystallization from aqueous ethanol there was obtained 158 mg. of pure 17 alpha-bromoprogesterone, M.P. 157–159°. The identity of the sample with the previously described product was established by infrared analysis.

*Example 3*

The above described method of preparation can be altered to allow the use, as starting materials, of products saturated in rings A and B. This adaptation of the above described method is of particular value for the preparation of ring C substituted derivatives. Using this method, a 4,17-dihalide is prepared instead of a 5,6,17-trihalide and subsequently the elements of hydrogen halide are eliminated in positions 4 and 5 to yield a delta⁴-17-monohalide. As an example for this method, the preparation of another important representative of the group of 17 alpha-halogenated hormone analogues, namely of 17 alpha-bromo-11-dehydro-corticosterone is described in more detail:

THE SYNTHESIS OF 17 ALPHA-BROMO-11-DEHYDRO-CORTICOSTERONE

The readily available 3 alpha-acetoxy-pregnane-11,20-dione (XVII) is converted by the action of isopropenyl acetate in the presence of an acid catalyst, such as sulfuric acid or p-toluenesulfonic acid, to the corresponding 20,21-en-20-ol acetate XVIII. Treatment of the enol acetate XVIII with one molecular equivalent of bromine leads to the 21-bromo diketo acetate XIX which is hydrolyzed with hydrogen chloride in absolute methanol to the corresponding free alcohol XXII. Oxidation of the latter with chromic acid in acetone in the presence of sulfuric acid affords the bromo triketone XXI which is subjected to the action of sodium iodide to give an excellent yield of the 21-iodide XXIa, which is transformed in the usual manner with potassium acetate to the 21-acetoxy triketone XX. This compound is treated with two molecular equivalents of bromine and the resulting 4 beta, 17 alpha-dibromide XXIV transformed in the usual way, via the 3-semicarbazone, to 17 alpha-bromo-11-dehydro-corticosterone acetate XXVa which is hydrolyzed to the free hormone analogue by the action of hydrogen chloride in absolute methanol in a nitrogen atmosphere. Prior to the halogenation of the triketo acetate XX this product can be converted to its enol acetate XXIII. In the above described sequence of reactions one can also use the 21-chlorides XIX, XXII and XXI instead of the bromides. The chloride XIX is obtained by the action of hypochlorous acid on the enol acetate XVIII.

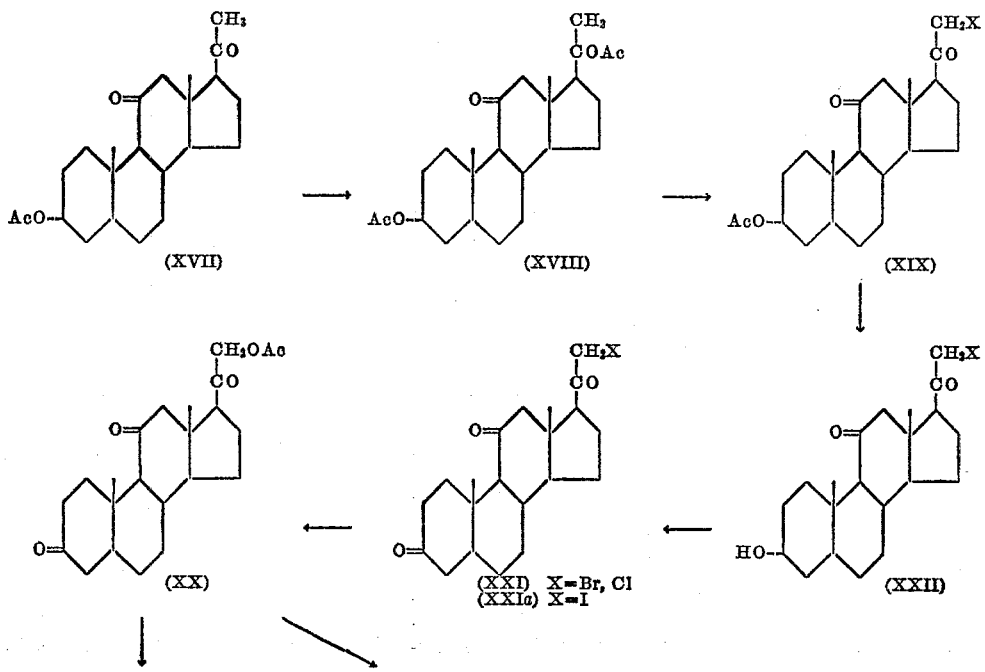

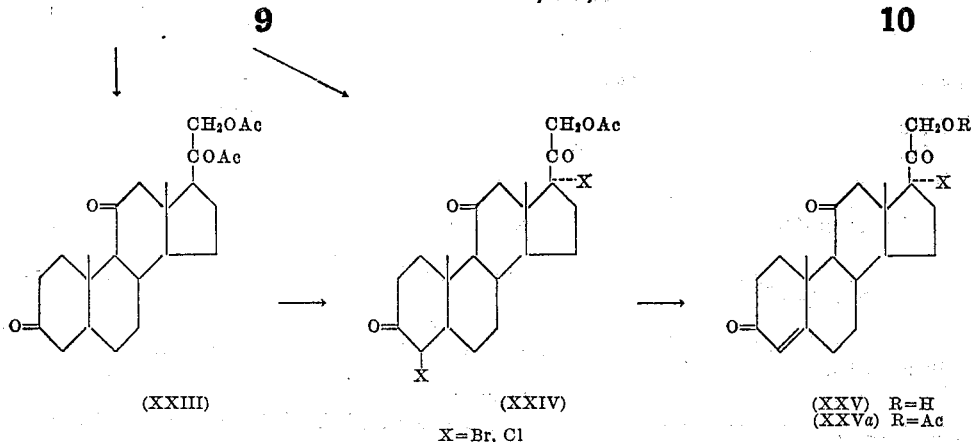

(XXIII)

(XXIV)
X = Br, Cl (XXV) R=H
(XXVa) R=Ac

DETAILED DESCRIPTION OF THE PREPARATION OF 17 ALPHA-BROMO-11-DEHYDRO-CORTICOSTERONE (XXV)

3 ALPHA,20-DIACETOXY-20-PREGNENE-11-ONE (XVIII)

A solution of 20 g. of 3 alpha-acetoxy-pregnane-11,20-dione (XVII) in 25 cc. of isopropenyl acetate and 0.05 cc. of concentrated sulfuric acid was refluxed for three hours. After cooling the solution was treated with 0.5 g. of potassium acetate and reduced to dryness in vacuo between 24°–30°. The organic product was extracted with methylene chloride, the organic solution was washed repeatedly with water, dried over sodium sulfate and taken to dryness, the amorphous residue was dissolved in a small quantity of benzene and chromatographed rapidly over 300 g. of neutral activated aluminum oxide. The petroleum ether-benzene and benzene-ether fractions afforded 17.53 g. of a crystalline material, representing the enol acetate XVIII, which was used without further purification in the following bromination reaction.

21-BROMO-3 ALPHA-ACETOXY-PREGNANE-11,20-DIONE (XIX)

To a solution of the above mentioned crystalline enol acetate XVIII (17.53 g.) in 220 cc. of acetic acid was added dropwise and with stirring 90 cc. of a brominating solution containing 7.9 g. of bromine, 87 cc. of acetic acid, 2.066 g. of potassium acetate and 3 cc. of water. After the addition of this solution, the mixture was stirred for another 10 minutes, poured into ice-cold water and extracted with methylene chloride. The organic solution was washed repeatedly with water, iced sodium bicarbonate solution and water, and was dried. The solvent was removed, first at atmospheric pressure and subsequently in vacuo. Crystallization from methylene chloride-methanol afforded 16.5 g. of the bromide XIX.

21-BROMO-PREGNANE-3,11,20-TRIONE (XXI)

The bromide XIX (16.5 g.) was dissolved in 500 cc. of absolute methanol containing 6.3 g. of hydrogen chloride. The solution was kept at room temperature for 24 hours. By the addition of water there was precipitated 13.1 g. of crude hydroxy bromide XXII which was oxidized without further purification, as follows: The product was dissolved in 1.5 l. of absolute acetone and there was added 14.57 cc. of an oxidizing solution prepared from 100 g. of chromic acid, 160 g. of concentrated sulfuric acid, and 500 cc. of water; the addition was effected dropwise, with stirring and under nitrogen. After one hour the reaction product was precipitated with water and extracted with ether. The ethereal solution was washed with water, iced sodium bisulfite solution, iced bicarbonate solution and water and was dried. Removal of the solvent at first at atmospheric pressure, subsequently in vacuo afforded 12.5 g. of amorphous, crude bromo triketone XXI which was used without further purification in the following reaction.

21-ACETOXY-PREGNANE-3,11,20-TRIONE (XX)

The above described crude bromo triketone XXI (12.5 g.) was dissolved in 300 cc. of absolute acetone, and was refluxed under nitrogen with 10 g. of sodium iodide in 180 cc. of absolute acetone for 45 minutes. Ether was added to the slightly yellow mixture and the ethereal solution was washed with water, twice with 30 cc. of ice-cold 1% sodium hydroxide solution and with water and was dried; the solvent was removed in vacuo. The crude iodide XXIa thus obtained was dissolved in 360 cc. of acetone and refluxed for 14 hours with 70 g. of potassium bicarbonate and 42 cc. glacial acetic acid. The mixture was poured into ice-water, extracted with ether, and the ethereal solution washed with water, iced sodium thiosulfate solution and with water, dried and taken to dryness. The usual reacetylation with 15 cc. of acetic anhydride in 30 cc. of pyridine afforded 10.9 g. of an amorphous product which was dissolved in a small quantity of benzene and chromatographed on 280 g. of aluminum oxide. The petroleum ether-benzene and benzene-ether fractions afforded 9.1 g. of a crystalline product which upon re-crystallization from ether-hexane afforded 8.1 g. of pure 21-acetoxy-pregnane-3,11,20-trione (XX).

4,17 ALPHA-DIBROMO-21-ACETOXY-PREGNANE-3,11,20-TRIONE (XXIV)

To a solution of 7.5 g. of the above described acetoxy triketone XX in 150 cc. of acetic acid, were added at room temperature, two drops of a 20% hydrogen bromide solution in acetic acid, and subsequently, dropwise and with stirring 6.171 g. of bromine in 75 cc. of acetic acid. The reaction product was precipitated with water, filtered, the residue was washed repeatedly and dried. Recrystallization from methylene chloride-methanol-water afforded 7.1 g. of dibromo triketone XXIV; the mother liquors were debrominated in the usual fashion with zinc in acetic acid to give 1.5 g. of acetoxy triketone XX.

17 ALPHA-BROMO-11-DEHYDROCORTICOSTERONE ACETATE [17 ALPHA-BROMO-21-ACETOXY-4-PREGNENE-3,11,20-TRIONE (XXVa)]

A solution of 6 g. of the above described dibromide XXIV was dissolved in 185 cc. of absolute, alcohol-free chloroform and 300 cc. of dry t-butyl alcohol and the air was displaced with carbon dioxide. To the mixture was added 1.7 g. of recrystallized semicarbazide base, and the flask was flushed with carbon dioxide, sealed and shaken repeatedly. After 125 minutes, unreacted semicarbazide was removed by filtration, and the filtrate was taken to dryness in vacuo. To the residue, 230 cc. of ethanol and 20 cc. of water were added, and the solution was reduced in vacuo at 45° to 140 cc. After dilution with a further 1.3 l. of water the mixture was cooled to −15°. The precipitate was filtered and washed repeatedly and dried in vacuo. Thus, 5.78 g. of the crude semicarbazone of the compound XXVa was obtained. The product was dissolved in 160 cc. of acetic acid and 60 cc. of water and the air was displaced with carbon dioxide. There was added 13.5 cc. of an aqueous 1.66 N pyruvic acid solution and the flask was flushed with carbon dioxide and sealed. After 16 hours the mixture was poured into water and extracted with ether. The organic solution was washed with iced sodium bicarbonate and sodium carbonate solutions, cold dilute hydrochloric acid, iced bicarbonate solution and water and was dried. Removal of the solvent afforded 5.7 g. of an amorphous product which was chromatographed on 300 g. of silica gel. Thus there was obtained 3.4 g. of 17 alpha-bromo-11-dehydro-corticosterone-acetate (XXVa).

17 ALPHA-BROMO-11-DEHYDRO-CORTICOSTERONE [17 ALPHA - BROMO - 21 - HYDROXY - 4 - PREGNENE - 3, 11,20-TRIONE (XXV)]

Acetate XXVa (2 g.) was dissolved in 75 cc. of absolute methanol containing 750 mg. of hydrogen chloride, and the solution was kept in a nitrogen atmosphere at room temperature for 24 hours. The usual working up afforded 1.1 g. of crystalline 17 alpha-bromo-11-dehydro-corticosterone (XXV).

Additional halogenated hormone analogues may be synthesized by the method outlined as follows:

A 16,17-unsaturated steroid is transformed through the action of hypobromous acid to the corresponding 17 alpha-bromo-16 beta-hydroxy steroid, which is subsequently converted to the 16 beta, 17 beta-epoxide in an alkaline medium. The yield in the preparation of the intermediate bromohydrin may be raised by the prolongation of the reaction. Applicant has also carried out the reaction in the presence of an 11-keto group, which represents a significant difference, insofar as substituents in 11 or 12 influence reactions in positions 16 and 17.

The 16 beta, 17 beta-epoxide is cleaved with hydrogen halides (hydrogen bromide, hydrogen chloride) in an appropriate solvent, e.g. chloroform and lower aliphatic alcohols to the corresponding 17 alpha-halo-16 beta-hydroxy steroids.

Further synthesis of a 16-non-substituted 17-brominated or chlorinated steroid consists in the tosylation of the 16-hydroxy group and subsequent reduction of the tosylate with a metal hydride, for instance lithium aluminum hydride. The method of converting the above mentioned halohydrins into 16 alpha-hydroxy-17 alpha-halo-derivatives of biological interest consists in the saponification of the above mentioned 16 beta-tosylate.

The following graphical description, using partial formulae, illustrates the general scheme of reactions.

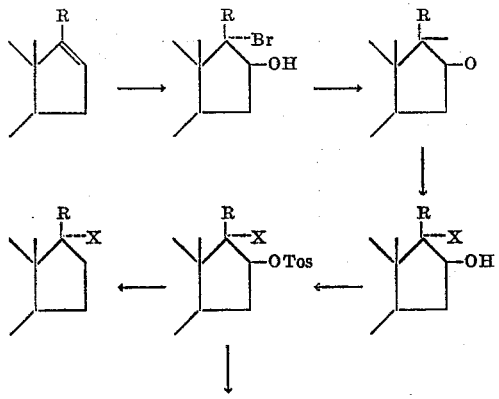

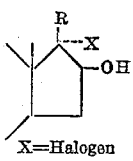

X=Halogen

Since many modifications of the foregoing reactions are possible the invention is not intended to be limited by the examples shown but only by the scope of the following claims.

The embodiments of the invention in which an exclusive property or privilege is claimed are defined as follows.

I claim:

1. Compounds of the following general formula:

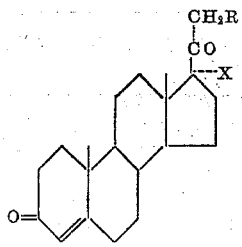

wherein X is a member of the group consisting of BR and Cl and R is a member of the group consisting of H, OH and hydrocarbon acyloxy.

2. 17 alpha-bromoprogesterone of the following formula:

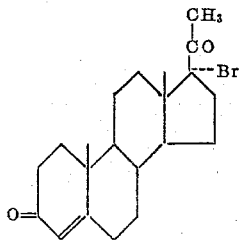

3. 17 alpha-chloroprogesterone of the following formula:

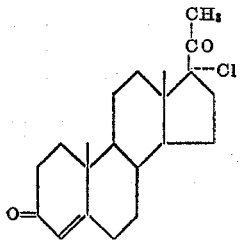

References Cited in the file of this patent
UNITED STATES PATENTS 2,684,963    Schock et al. _____ July 27, 1954
2,771,476    Lyttle et al. _____ Nov. 20, 1956